United States Patent
Kadowaki et al.

(10) Patent No.: US 9,134,500 B2
(45) Date of Patent: Sep. 15, 2015

(54) LENS BARREL AND IMAGING DEVICE

(71) Applicant: Panasonic Corporation, Osaka (JP)

(72) Inventors: Keita Kadowaki, Osaka (JP); Tetsuya Hokamura, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/262,174

(22) Filed: Apr. 25, 2014

(65) Prior Publication Data
US 2014/0355141 A1  Dec. 4, 2014

(30) Foreign Application Priority Data

May 29, 2013  (JP) .................................. 2013-112606
Apr. 14, 2014  (JP) .................................. 2014-082458

(51) Int. Cl.
*G02B 7/02* (2006.01)
(52) U.S. Cl.
CPC ...................................... *G02B 7/023* (2013.01)
(58) Field of Classification Search
CPC ............. G02B 7/023; G02B 7/00; G02B 7/02
See application file for complete search history.

(56) References Cited

U.S. PATENT DOCUMENTS

2001/0050711 A1* 12/2001 Karube et al. ................ 348/220

FOREIGN PATENT DOCUMENTS

JP          05-167901 A      7/1993

* cited by examiner

*Primary Examiner* — Joseph P Martinez
(74) *Attorney, Agent, or Firm* — Renner, Otto, Boisselle & Sklar, LLP

(57) ABSTRACT

An object is to realize further size reduction in a lens barrel in which a barrel unit is rotatable in three axis directions. The lens barrel includes a support portion for supporting the barrel unit, a part of the support portion being fixed to an external member, an actuator including a drive base movable in a direction parallel to a surface passing through an optical axis of the barrel unit, and a universal joint mechanism portion for linking the barrel unit and the drive base of the actuator. The support portion supports the barrel unit rotatably about a pitch axis, a roll axis, and a yaw axis with respect to the optical axis direction, and the actuator drives the barrel unit about the pitch axis, the roll axis, and the yaw axis by moving the drive base.

8 Claims, 16 Drawing Sheets

Translation in Y Axis Direction
(Rotation about X Axis)

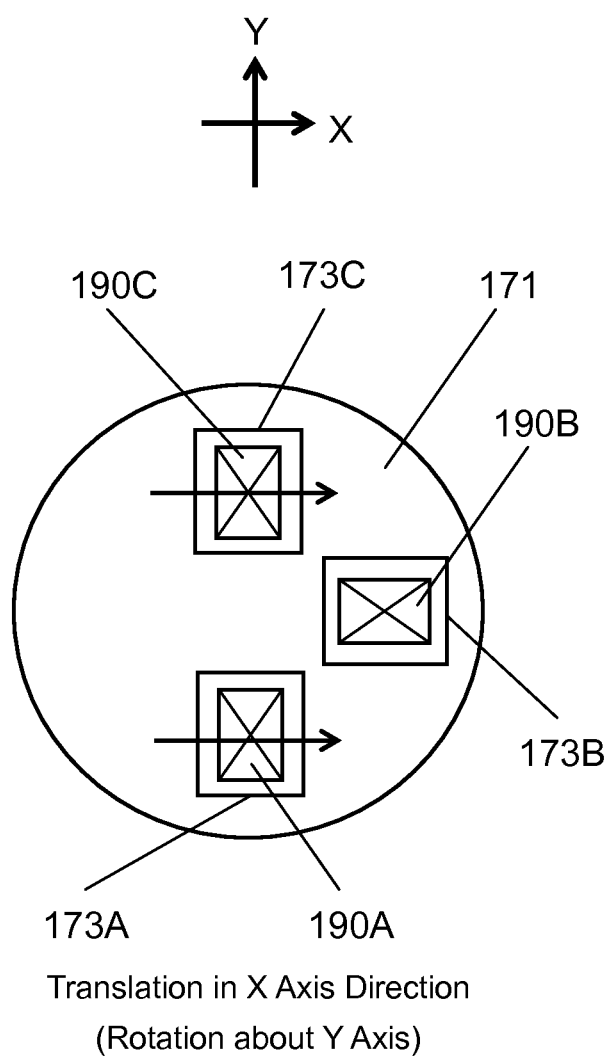

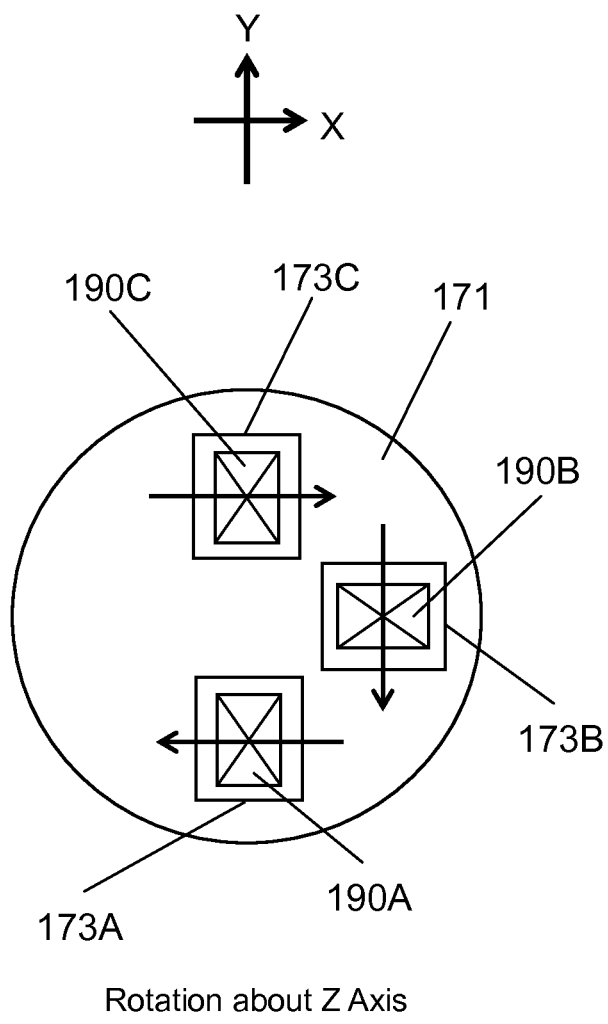
Rotation about Z Axis

LENS BARREL AND IMAGING DEVICE

BACKGROUND

1. Technical Field

The present disclosure relates to a lens barrel in which a barrel unit is rotatable in three axis directions, and an imaging device.

2. Description of the Related Art

Unexamined Japanese Patent Publication No. H05-167901 provides an imaging device in which a lens barrel is rotatable with respect to predetermined two axes.

SUMMARY

An object of the present disclosure is to realize further size reduction in a lens barrel in which a barrel unit is rotatable in three axis directions.

The lens barrel in the present disclosure includes a support portion for supporting a barrel unit, a part of the support portion being fixed to an external member, an actuator including a drive base movable in a direction parallel to a surface passing through an optical axis of the barrel unit, and a universal joint mechanism portion for linking the barrel unit and the drive base of the actuator, wherein the support portion supports the barrel unit rotatably about a pitch axis, a roll axis, and a yaw axis with respect to an optical axis direction, and wherein the actuator drives the barrel unit about the pitch axis, the roll axis, and the yaw axis by moving the drive base.

In the lens barrel in the present disclosure, a configuration that the barrel unit is rotatable in three axis directions can be realized as a simple configuration, and further size reduction of the lens barrel can be realized.

BRIEF DESCRIPTION OF DRAWINGS

FIGS. 8A to 8C are illustrative views for illustrating a drive force acting on the drive base in the first embodiment;

DETAILED DESCRIPTION OF THE PREFERRED EMBODIMENTS

Hereinafter, embodiments will be described in detail with reference to the drawings in an appropriate manner. However, the embodiments may not be described in too much detail. For example, already-well-known matters may not be described in detail and the substantially same configurations may not be repeatedly described. This is to avoid the situation that the following description becomes unnecessarily redundant and to facilitate understanding of those skilled in the art.

It should be noted that the inventors provide the attached drawings and the following description so that those skilled in the art will fully understand the present disclosure but do not intend to limit the subject matter described in the claims by the drawings and the description.

First Embodiment

Hereinafter, lens barrel 100 according to a first embodiment will be described with reference to FIGS. 1 to 11C.

1. Configuration of Lens Barrel (FIGS. 1, 2, 3, and 4)

Figure 1:
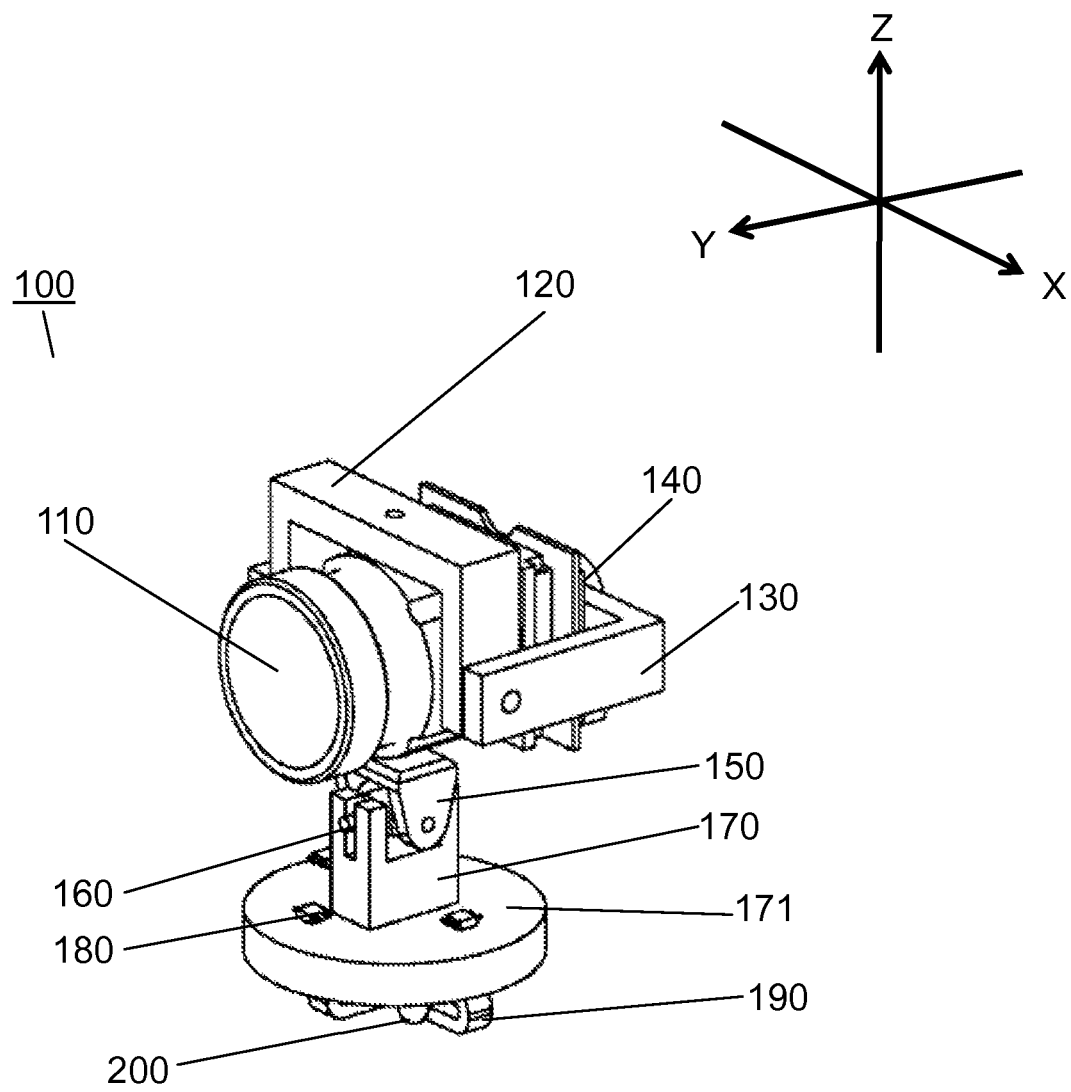
FIG. 1 is a perspective view of a lens barrel in a first embodiment.
Figure 2:
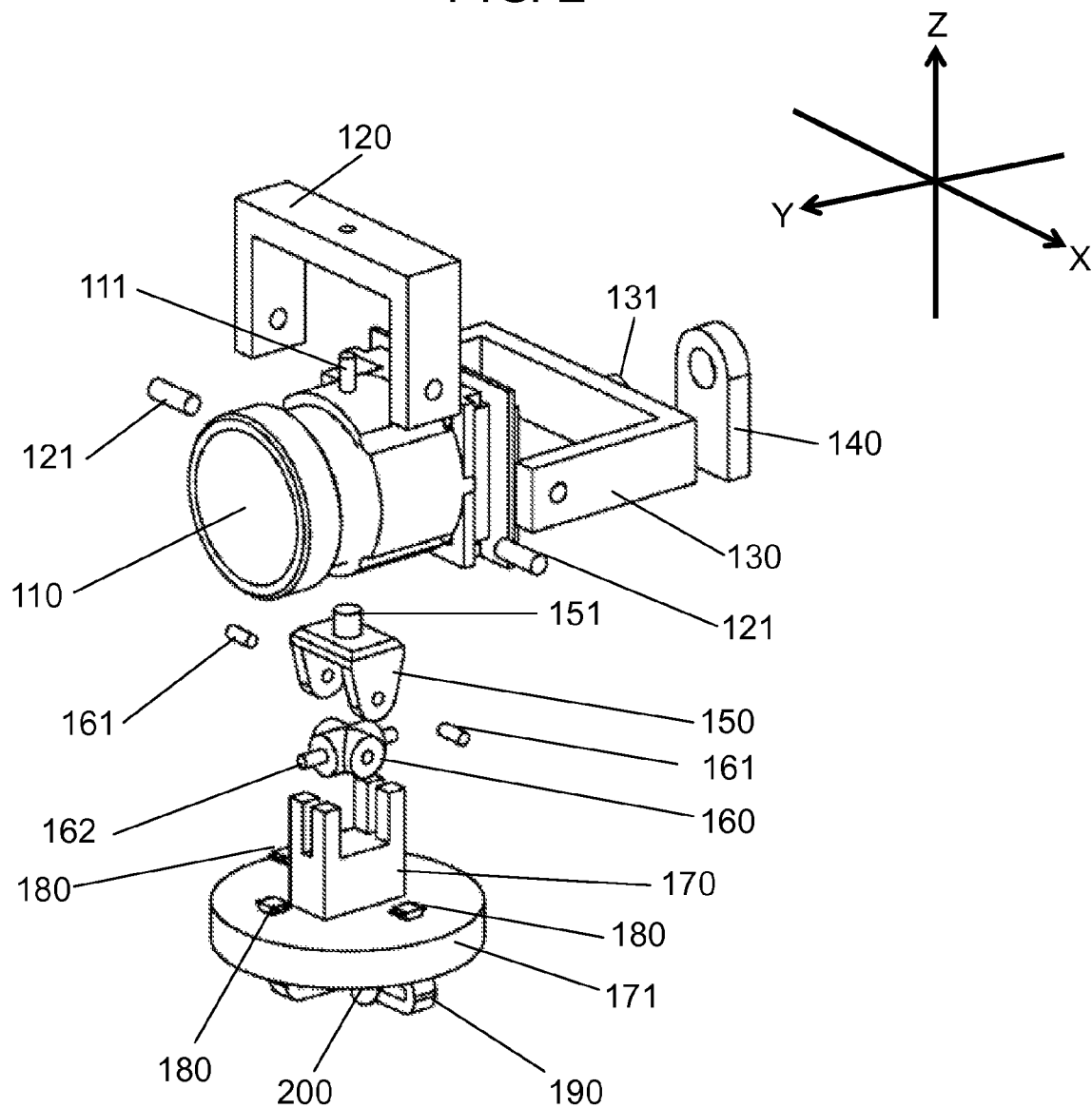
FIG. 2 is an exploded perspective view of the lens barrel in the first embodiment.

FIG. 1 is a perspective view of an outer appearance of lens barrel 100 in the first embodiment. FIG. 2 is an exploded perspective view of lens barrel 100 in the first embodiment. Lens barrel 100 shown in FIGS. 1, and 2 has a configuration that barrel unit 110 is rotatable about three X, Y, Z axes, and includes an image stabilization mechanism by an OIS (Optical Image Stabilizer). Barrel unit 110 includes an imaging optical system, frames for holding the imaging optical system, and an imaging element. The three axes shown in FIGS. 1 and 2, the axes being orthogonal to each other are the X axis, the Y axis, and the Z axis, respectively. The X axis, the Y axis, and the Z axis respectively correspond to the pitch axis, the roll axis, and the yaw axis.

As shown in FIGS. 1, and 2, lens barrel 100 includes barrel unit 110, Z rotation support frame 120, X rotation support frame 130, Y rotation support frame 140, X rotation drive frame 150, Y rotation drive frame 160, Z rotation drive frame 170, and an actuator having drive base 171, position detection sensor 180, coil 190, and ball 200. Z rotation support frame 120 is one example of a yaw axis support portion, X rotation support frame 130 is one example of a pitch axis support portion, and Y rotation support frame 140 is one example of a roll axis support portion. These portions form a support portion for supporting barrel unit 110. The support portion supports barrel unit 110 rotatably about the pitch axis (X axis), the roll axis (Y axis), and the yaw axis (Z axis) with respect to the optical axis direction. The actuator drives barrel unit 110 about the pitch axis, the roll axis, and the yaw axis by moving drive base 171.

Y rotation support frame 140 is fixed to a casing (not shown) of an imaging device. Therefore, since X rotation support frame 130 is rotatably held on Y rotation support frame 140 fixed to the casing of the imaging device, barrel unit 110 is rotatable about the roll axis (Y axis). Since Z rotation support frame 120 is rotatably held on X rotation support frame 130, barrel unit 110 is rotatable about the pitch axis (X axis). Further, since barrel unit 110 is engaged with Z rotation shaft 111 of barrel unit 110 on X rotation support frame 130, barrel unit 110 is rotatable around the yaw axis (Z axis).

X rotation drive frame 150, Y rotation drive frame 160, and Z rotation drive frame 170 are respectively one example of a first linking portion, a second linking portion, and a third linking portion. These portions form a universal joint mechanism portion for linking barrel unit 110 and drive base 171 of the actuator. The universal joint mechanism portion includes X rotation drive frame 150 linked with a side surface of barrel unit 110, Y rotation drive frame 160 linked with X rotation drive frame 150 in such a manner that a drive force is transmittable, and Z rotation drive frame 170 linked with Y rotation drive frame 160 in such a manner that the drive force is transmittable. Drive base 171 of the actuator is linked with Z rotation drive frame 170.

Drive base 171 of the actuator is held by the casing (not shown) of the imaging device serving as an external member of lens barrel 100 via ball 200 so that drive base 171 is translatable in the X and Y directions parallel to a surface passing through the optical axis of barrel unit 110 and also rotatable about the Z axis. Y rotation support frame 140 serving as a part of the support portion is fixed to the casing of the imaging device serving as the external member of lens barrel 100.

As shown in FIG. 2, Z rotation support frame 120 is engaged with barrel unit 110 via Z rotation shaft 111. Z rotation shaft 111 is fixed to barrel unit 110 and engaged rotatably about the Z axis with respect to Z rotation support frame 120. Specifically, Z rotation support frame 120 has a U shape and forms a recess with two protruding parts and a linking part linking the protruding parts. X rotation shafts 121 are respectively fixed to the two protruding parts, and a bearing portion (hole) is formed in a center of the linking part. Barrel unit 110 is inserted into the recess of Z rotation support frame 120 from the side surface side of barrel unit 110 so that a part of the side surface of barrel unit 110 is covered with Z rotation support frame 120. Z rotation shaft 111 fixed to barrel unit 110 is fitted into the bearing portion (hole) formed in the linking part of Z rotation support frame 120.

It should be noted that Z rotation shaft 111 is fixed to barrel unit 110 and fitted into the bearing portion (hole) of Z rotation support frame 120 in the above embodiment. However, the Z rotation shaft may be fixed to Z rotation support frame 120 and fitted into a bearing portion (hole) formed in barrel unit 110.

X rotation support frame 130 is engaged with Z rotation support frame 120 via X rotation shafts 121. X rotation shafts 121 are fixed to Z rotation support frame 120 and engaged rotatably about the X axis with respect to X rotation support frame 130. Specifically, X rotation support frame 130 has a U shape and forms a recess with two protruding parts and a linking part linking the protruding parts. Bearing portions (holes) are respectively formed in the two protruding parts, and Y rotation shaft 131 is fixed to the center of the linking part. Barrel unit 110 is inserted into the recess of X rotation support frame 130 from a back surface side of barrel unit 110 so that a part of the side surface of barrel unit 110 is covered with X rotation support frame 130. X rotation shafts 121 fixed to Z rotation support frame 120 are fitted into the bearing portions (holes) formed in the protruding parts of X rotation support frame 130.

It should be noted that X rotation shafts 121 are fixed to Z rotation support frame 120 and fitted into the bearing portions (holes) of X rotation support frame 130 in the above embodiment. However, X rotation shafts 121 may be fixed to X rotation support frame 130 and fitted into bearing portions (holes) formed in Z rotation support frame 120.

Y rotation support frame 140 is engaged with X rotation support frame 130 via Y rotation shaft 131. Y rotation shaft 131 is fixed to X rotation support frame 130 and engaged rotatably about the Y axis with respect to Y rotation support frame 140. Y rotation shaft 131 is fitted into a bearing portion (hole) formed in Y rotation support frame 140. Y rotation support frame 140 is fixed to the casing (not shown) outside lens barrel 100.

It should be noted that Y rotation shaft 131 are fixed to X rotation support frame 130 and fitted into the bearing portion (hole) of Y rotation support frame 140 in the above embodiment. However, Y rotation shaft 131 may be fixed to Y rotation support frame 140 and fitted into a bearing portion (hole) formed in X rotation support frame 130. Y rotation support frame 140 may be formed as a part of the casing.

X rotation drive frame 150 is fixed to barrel unit 110 via guide shaft A151. Guide shaft A151 and Z rotation shaft 111 are arranged on the same straight line. Guide shaft A151 is one example of a first linking shaft. Specifically, X rotation drive frame 150 has a U shape and forms a recess with two protruding parts protruding in a negative direction of the Z axis and a linking part linking the protruding parts. Bearing portions (holes) are respectively formed in the two protruding parts, and guide shaft A151 is fixed to the center of the linking part.

Y rotation drive frame 160 is engaged with X rotation drive frame 150 via guide shafts B161. Guide shafts B161 are fixed to Y rotation drive frame 160 and engaged rotatably about the X axis with respect to X rotation drive frame 150. Specifically, Y rotation drive frame 160 has guide shafts B161 in an X axis direction and guide shaft C162 in a Y axis direction, and has a cylindrical shape in the X axis direction and the Y axis direction. Guide shafts B161 are arranged on a straight line parallel to the X axis and fitted into bearing portions (holes) formed in X rotation drive frame 150. Y rotation drive frame 160 is arranged in the recess of X rotation drive frame 150 so as to be fitted into the U shape. Guide shafts B161 are one example of a second linking shaft, and guide shaft C162 is one example of a third linking shaft.

Z rotation drive frame 170 is engaged with Y rotation drive frame 160 via guide shaft C162. Guide shaft C162 is arranged so as to be placed on a straight line parallel to the Y axis and fixed to Y rotation drive frame 160. Guide shaft C162 is engaged with Z rotation drive frame 170 in such a manner that Y rotation drive frame 160 is rotatable about the Y axis and slidable in the Z axis direction. Specifically, Z rotation drive frame 170 has a U shape and forms a recess with two protruding parts protruding in a positive direction of the Z axis and a linking part linking the protruding parts. Bearing portions (grooves) opened in the positive direction of the Z axis are respectively formed in the two protruding parts. Guide shaft C162 is fitted into the bearing portions (grooves), and Y rotation drive frame 160 is arranged so as to be fitted into the recess of Z rotation drive frame 170.

Figure 3:
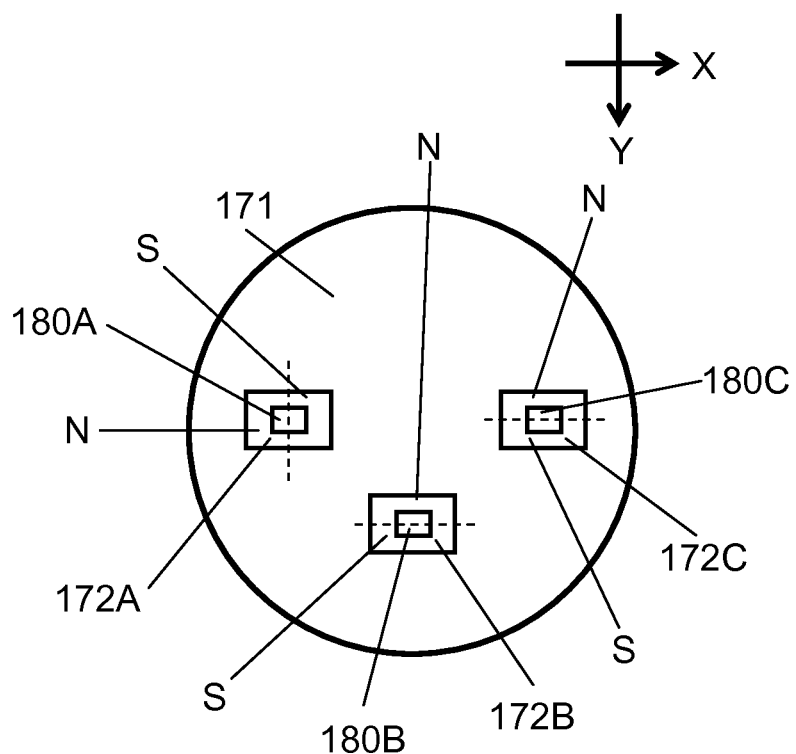
FIG. 3 is a top view of a drive base in the first embodiment.
Figure 4:
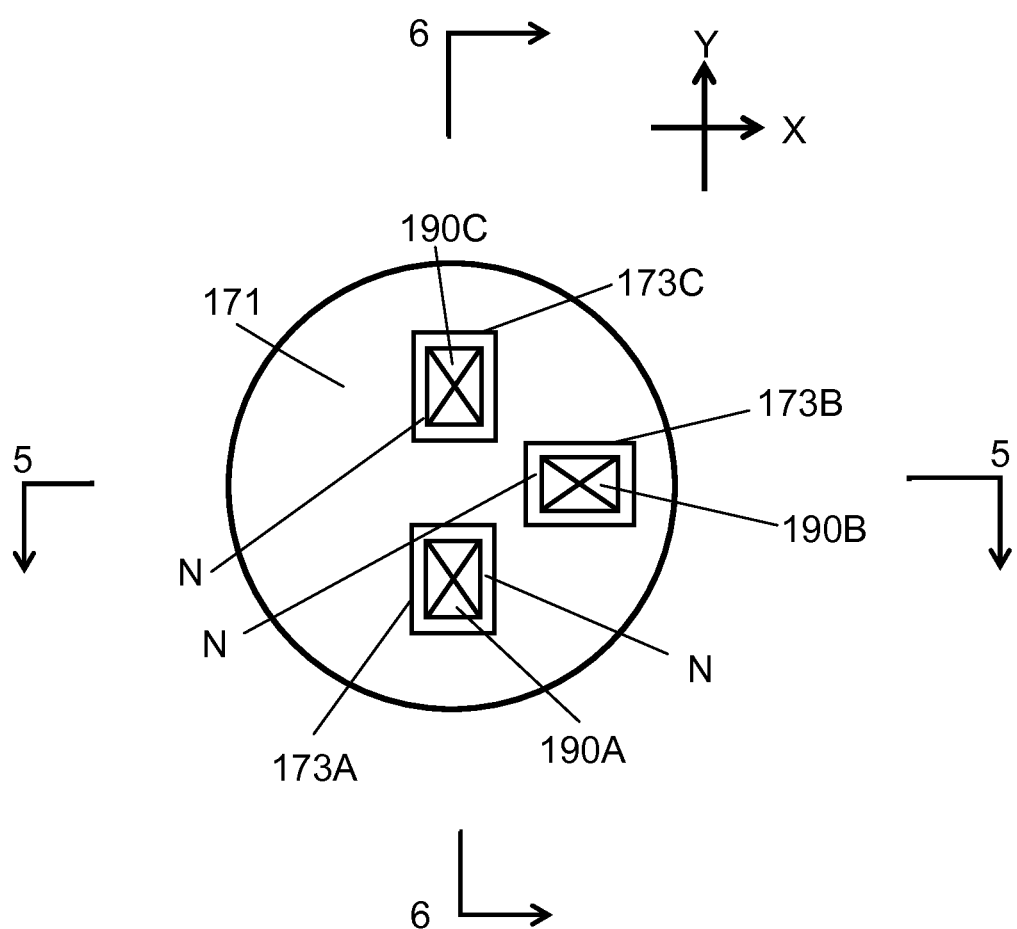
FIG. 4 is a bottom view of the drive base in the first embodiment.

FIG. 3 is a top view of drive base 171 of lens barrel 100 in the first embodiment. FIG. 4 is a bottom view of drive base 171. As shown in FIGS. 3, and 4, position detection sensor 180 includes three position detection sensors 180A, 180B, 180C. Coil 190 includes three coils 190A, 190B, 190C.

As shown in FIG. 3, drive base 171 has position detecting magnets 172A, 172B, 172C on a top surface side. Position detecting magnets 172A, 172B, 172C are arranged on a plane parallel to an XY plane. Position detecting magnet 172A is arranged in such a manner that a center thereof is placed at a negative position on the X axis. Position detecting magnet 172B is arranged in such a manner that a center thereof is placed at a positive position on the Y axis. Position detecting magnet 172C is arranged in such a manner that a center thereof is placed at a positive position on the X axis.

As shown in FIG. 3, two poles are magnetized in the X direction in position detecting magnet 172A, and two poles are magnetized in the Y direction in position detecting magnet 172B and position detecting magnet 172C. The reference signs "N" and "S" shown in FIG. 3 respectively denote the N pole and the S pole showing the polarities of the magnet.

As shown in FIG. 4, drive base 171 has driving magnets 173A, 173B, 173C on a bottom surface side. Driving magnets 173A, 173B, 173C are arranged on a plane parallel to the XY plane, and a single pole is magnetized as shown in FIG. 4.

Driving magnet 173A is arranged in such a manner that a center thereof is placed at a negative position on the Y axis. Driving magnet 173B is arranged in such a manner that a center thereof is placed at a positive position on the X axis. Driving magnet 173C is arranged in such a manner that a center thereof is placed at a positive position on the Y axis. The reference sign "N" shown in FIG. 4 denotes the N pole showing the polarity of the magnet.

As shown in FIG. 3, position detection sensors 180A, 180B, 180C are arranged at positions facing position detecting magnets 172A, 172B, 172C at a fixed distance from position detecting magnets 172A, 172B, 172C in the Z direction. Position detection sensors 180A, 180B, 180C are arranged in such a manner that centers thereof respectively overlap with those of position detecting magnets 172A, 172B, 172C. Position detection sensors 180A, 180B, 180C are fixed to the casing (not shown) outside lens barrel 100.

Figure 5:
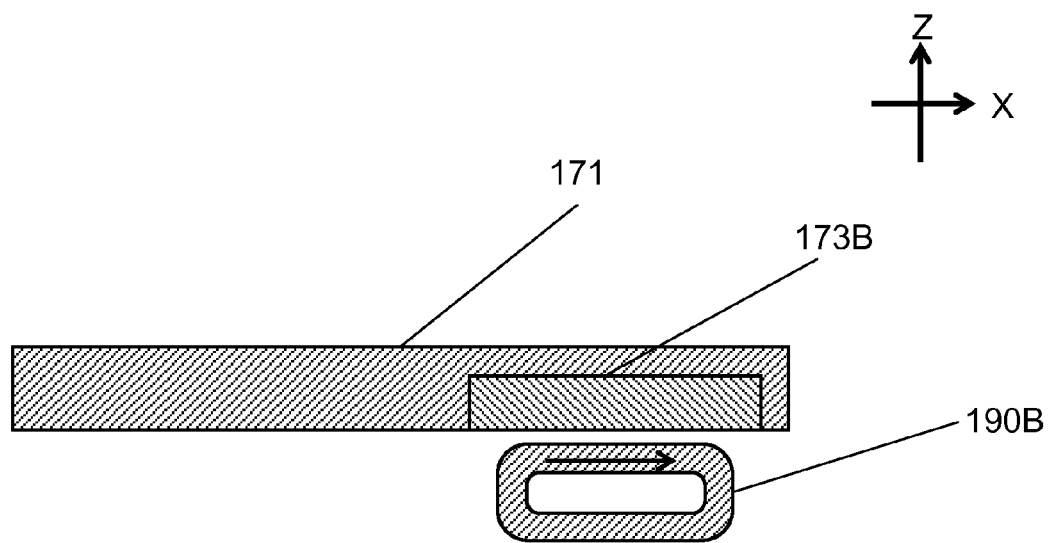
FIG. 5 is a sectional view taken along line 5-5 shown in FIG. 4, the view showing the drive base at the time of rotation about an X axis and a Z axis in the first embodiment.
Figure 6:
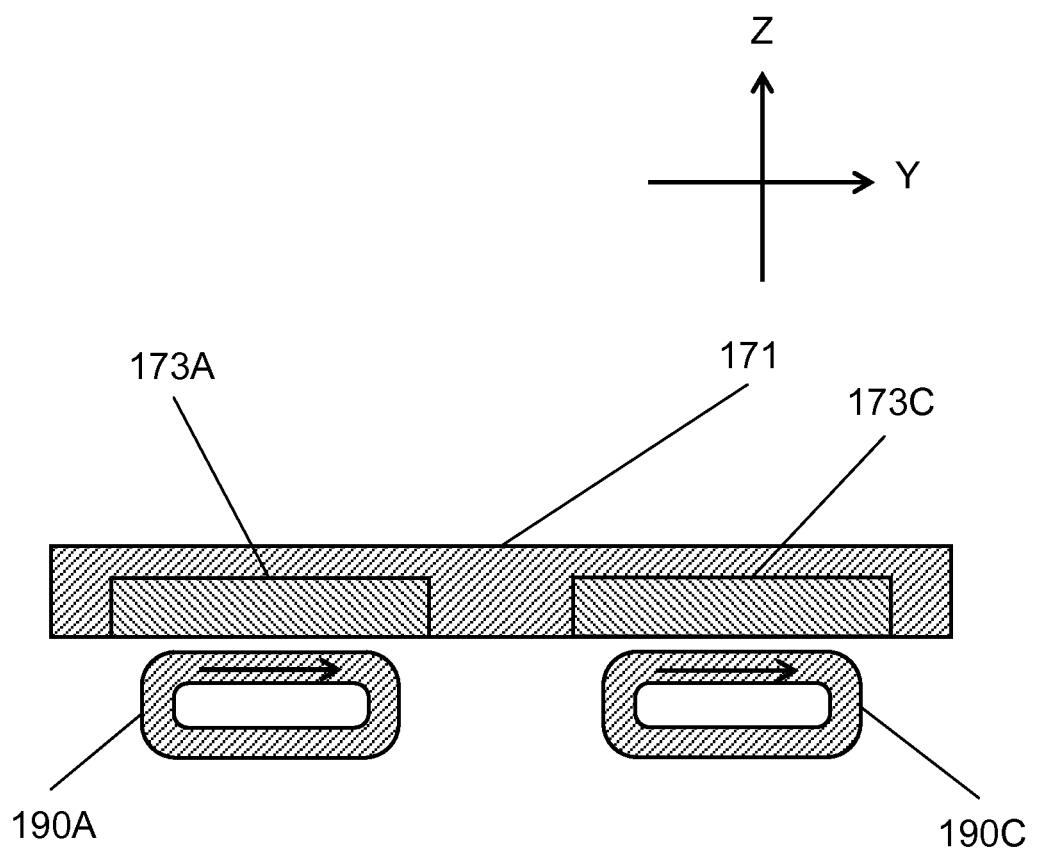
FIG. 6 is a sectional view taken along line 6-6 shown in FIG. 4, the view showing the drive base at the time of rotation about a Y axis in the first embodiment.
Figure 7:
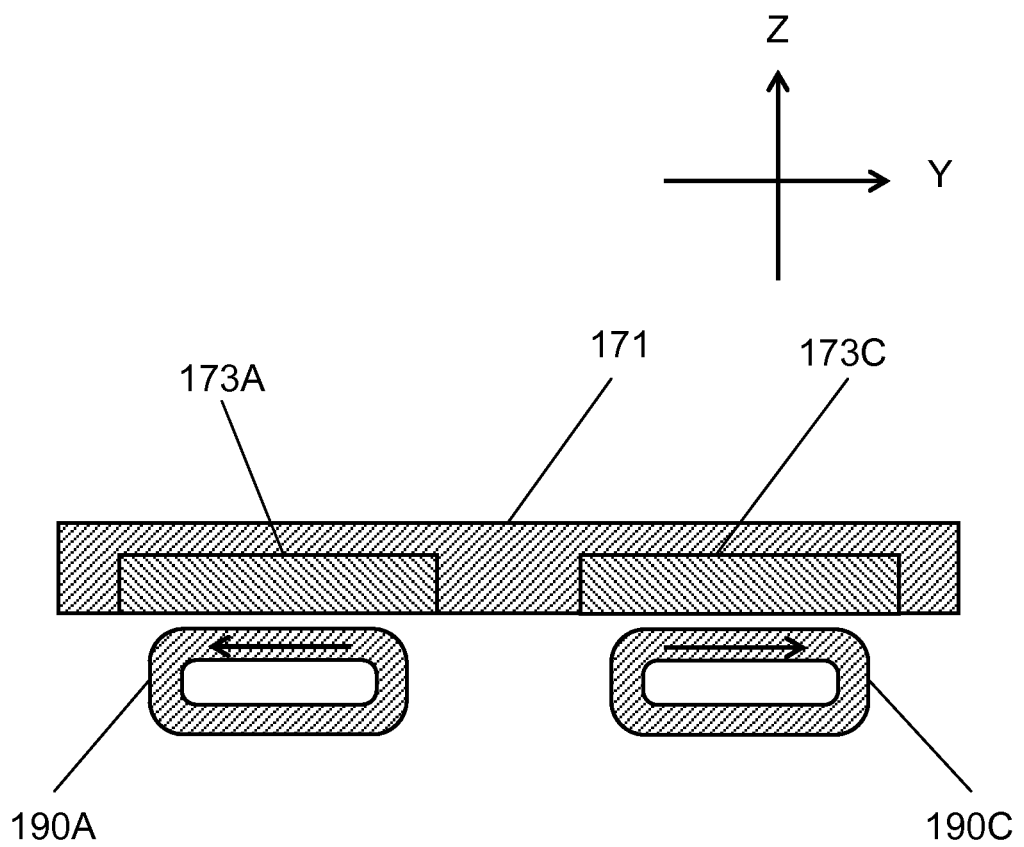
FIG. 7 is a sectional view taken along line 6-6 shown in FIG. 4, the view showing the drive base at the time of rotation about the Z axis in the first embodiment.

FIG. 5 is a sectional view taken along line 5-5 shown in FIG. 4, the view showing drive base 171 at the time of rotation about the X axis and the Z axis. FIG. 6 is a sectional view taken along line 6-6 shown in FIG. 4, the view showing drive base 171 at the time of rotation about the Y axis. FIG. 7 is a sectional view taken along line 6-6 shown in FIG. 4, the view showing drive base 171 at the time of rotation about the Z axis. It should be noted that in FIGS. 5, 6, and 7, arrows described with coils 190A, 190B, 190C indicate the directions of the electric current flowing through the coils.

As shown in FIGS. 5, 6, and 7, coils 190A, 190B, 190C are arranged at positions facing driving magnets 173A, 173B, 173C at a fixed distance from driving magnets 173A, 173B, 173C in the Z direction. Coils 190A, 190B, 190C are arranged in such a manner that centers thereof respectively overlap with those of driving magnets 173A, 173B, 173C. Coils 190A, 190B, 190C are fixed to the casing (not shown) outside lens barrel 100.

Figure 8A:
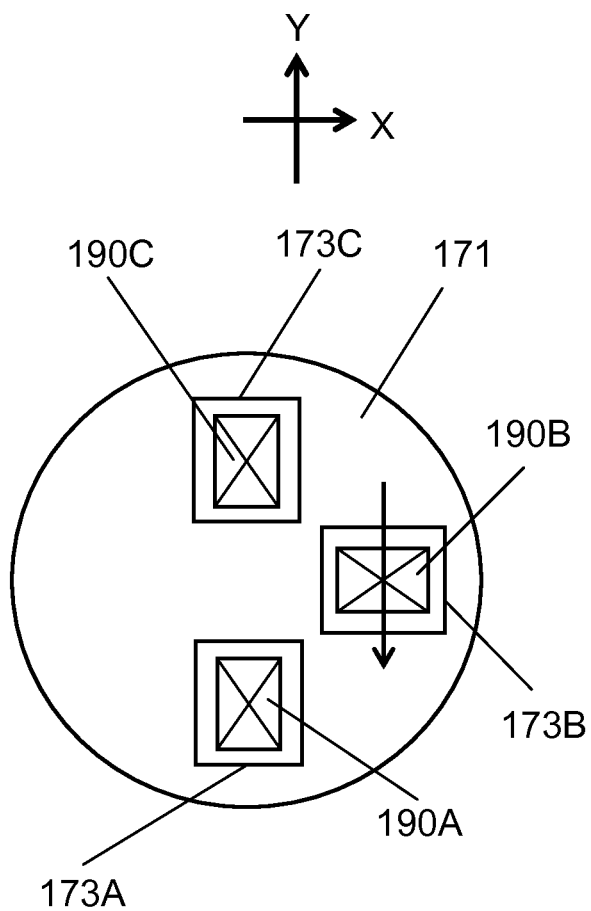
Figure 9A:
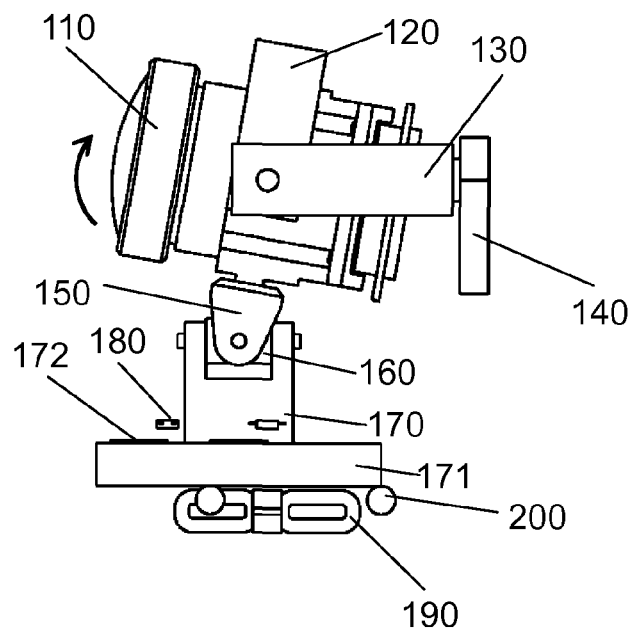
FIGS. 9A to 9C are illustrative views for illustrating rotation about the X axis of the lens barrel in the first embodiment.
Figure 9B:
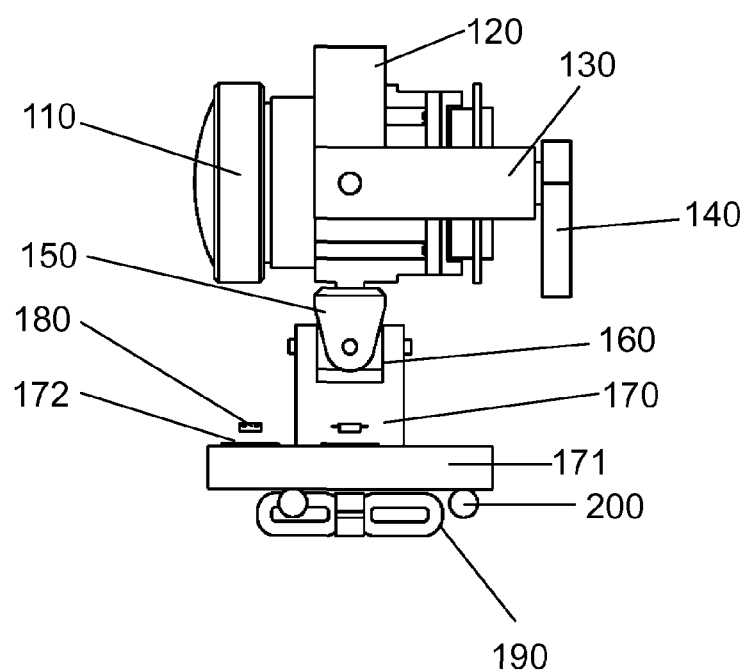
Figure 9C:
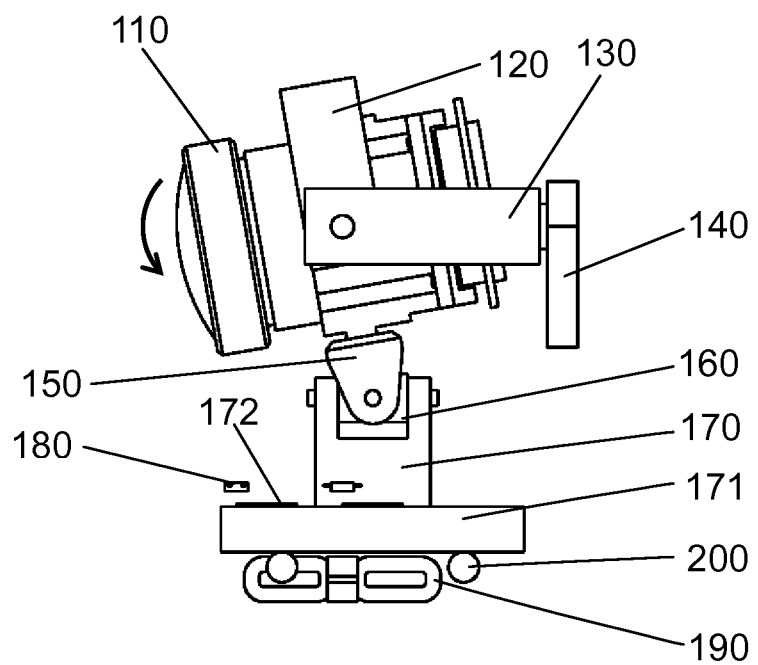
Figure 10A:
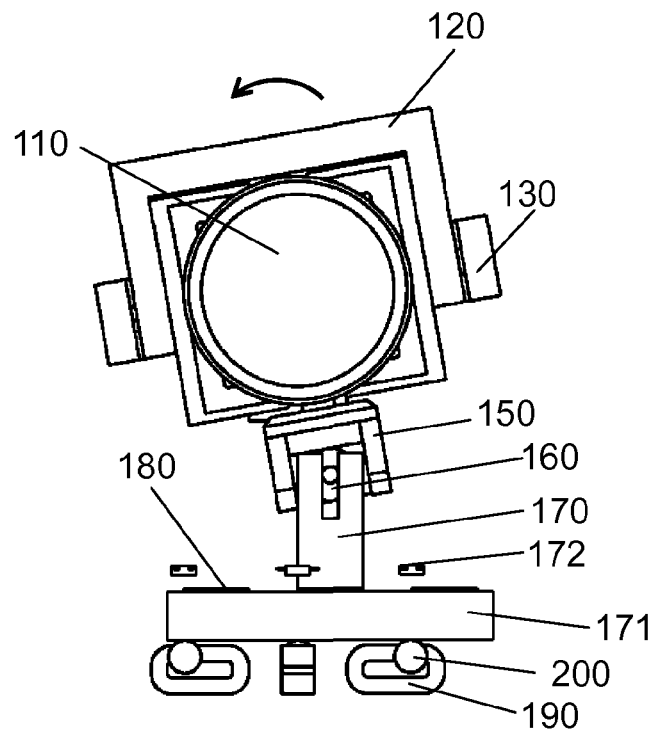
FIGS. 10A to 10C are illustrative views for illustrating rotation about the Y axis of the lens barrel in the first embodiment.
Figure 10B:
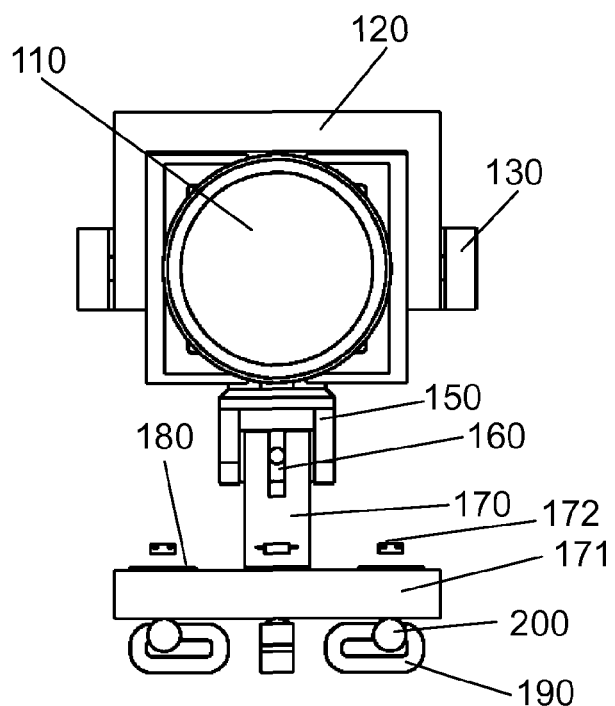
Figure 10C:
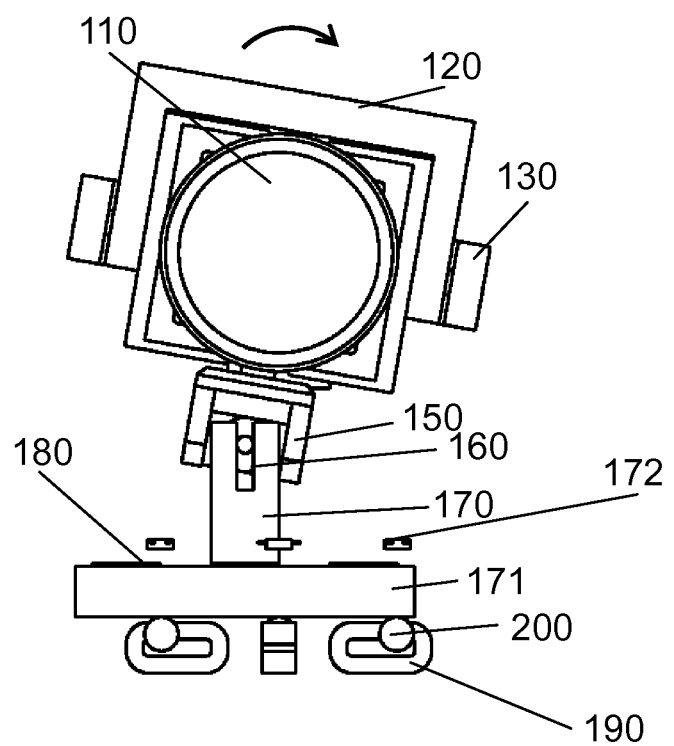
Figure 11A:
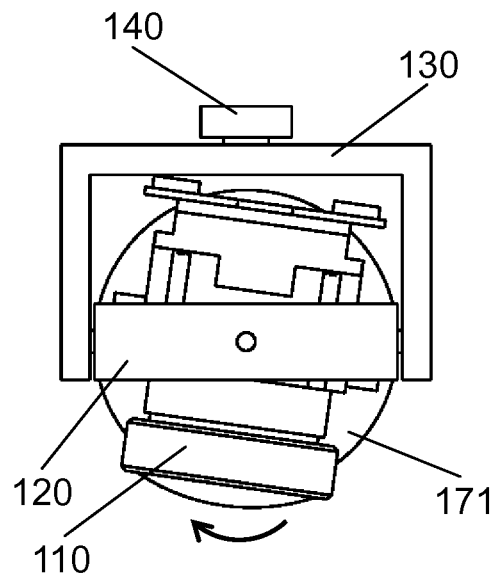
FIGS. 11A to 11C are illustrative views for illustrating rotation about the Z axis of the lens barrel in the first embodiment.
Figure 11B:
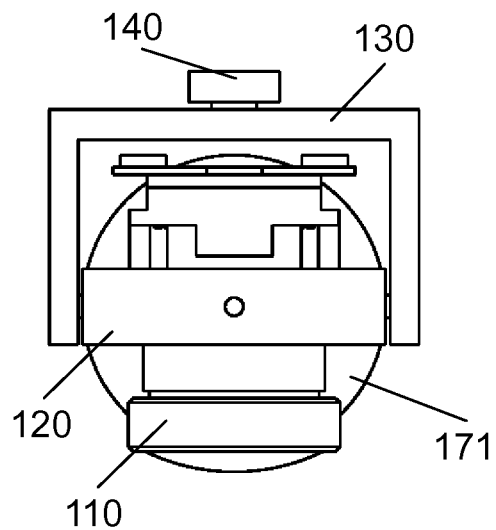
Figure 11C:
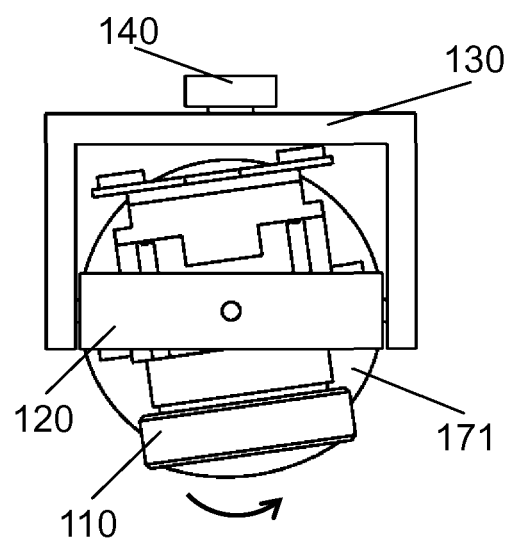

FIGS. 8A to 8C are illustrative views for illustrating a drive force acting on drive base 171. Arrows shown in FIGS. 8A to 8C indicate the directions of the drive force received by drive base 171. FIGS. 9A to 9C are illustrative views for illustrating rotation about the X axis of barrel unit 110. FIGS. 10A to 10C are illustrative views for illustrating rotation about the Y axis of barrel unit 110. FIGS. 11A to 11C are illustrative views for illustrating rotation about the Z axis of barrel unit 110. It should be noted that FIGS. 9B, 10B, and 11B show a positive posture state without any rotation, and FIGS. 9A, 9C, 10A, 10C, 11A, and 11C respectively show a rotation state. Hereinafter, with reference to these figures, respective actions will be described.

2. Rotation Action About X Axis (FIGS. 5, 8A, and 9A to 9C)

When the electric current flows through coil 190B, drive base 171 is translated in the Y axis direction by an electromagnetic force acting between coil 190B and driving magnet 173B. For example, when the electric current flows through coil 190B in the direction of the arrow shown in FIG. 5 (positive direction of the X axis), drive base 171 is translated in the direction of the arrow shown in FIG. 8A (negative direction of the Y axis). In accordance with the amount and the direction of the electric current flowing through coil 190B, the amount and the direction of translation in the Y axis direction of drive base 171 are controlled.

As shown in FIGS. 9A to 9C, when drive base 171 is translated in the Y axis direction, Z rotation drive frame 170, Y rotation drive frame 160, and X rotation drive frame 150 are translated in the Y axis direction while Y rotation drive frame 160 slides in the Z direction and X rotation drive frame 150 is rotated about the X axis with respect to Y rotation drive frame 160. Accordingly, barrel unit 110 is rotated about the X axis with respect to X rotation support frame 130 via Z rotation support frame 120. That is, when drive base 171 is translated in the positive direction of the Y axis, barrel unit 110 is rotated in the clockwise direction seen from the positive direction of the X axis (FIG. 9A). Meanwhile, when drive base 171 is translated in the negative direction of the Y axis, barrel unit 110 is rotated in the anti-clockwise direction seen from the positive direction of the X axis (FIG. 9C). The arrows shown in FIGS. 9A and 9C indicate the rotation directions of barrel unit 110 of this case.

When drive base 171 is translated in the Y direction, magnetic flux densities of position detecting magnets 172B, 172C passing through position detection sensors 180B, 180C are changed. The magnetic flux densities of position detecting magnet 172B and position detecting magnet 172C respectively passing through position detection sensor 180B and position detection sensor 180C are increased when drive base 171 is driven in the positive direction of the Y axis and reduced when drive base 171 is driven in the negative direction of the Y axis. Therefore, the translation direction and the translation amount of drive base 171 can be detected. By utilizing the translation direction and the translation amount, the direction and the amount of rotation about the X axis of barrel unit 110 can be detected.

3. Rotation Action About Y Axis (FIGS. 6, 8B, and 10A to 10C)

When the electric current flows through coils 190A, 190C, drive base 171 is translated in the X axis direction by an electromagnetic force acting between coils 190A, 190C and driving magnets 173A, 173C. For example, when the electric current flows through coils 190A, 190C in the direction of the arrow shown in FIG. 6 (positive direction of the Y axis), drive base 171 is translated in the direction of the arrow shown in FIG. 8B (positive direction of the X axis). In accordance with the amount and the direction of the electric current respectively flowing through coils 190A, 190C, the amount and the direction of translation in the X axis direction of drive base 171 are controlled.

As shown in FIGS. 10A to 10C, when drive base 171 is translated in the X axis direction, Z rotation drive frame 170 and Y rotation drive frame 160 are translated in the X axis direction while Y rotation drive frame 160 slides in the Z axis direction and Y rotation drive frame 160 is rotated about the Y axis with respect to Z rotation drive frame 170. Accordingly, barrel unit 110 and X rotation drive frame 150 are rotated about the Y axis with respect to Y rotation support frame 140 via Z rotation support frame 120 and X rotation support frame 130. That is, when drive base 171 is translated in the positive direction of the X axis, barrel unit 110 is rotated in the anti-clockwise direction seen from the positive direction of the Y axis (FIG. 10A). Meanwhile, when drive base 171 is translated in the negative direction of the X axis, barrel unit 110 is rotated in the clockwise direction seen from the positive direction of the Y axis (FIG. 10C). The arrows shown in FIGS. 10A and 10C indicate the rotation directions of barrel unit 110 of this case.

When drive base 171 is translated in the X axis direction, a magnetic flux density of position detecting magnet 172A passing through position detection sensor 180A is changed. The magnetic flux density of position detecting magnet 172A passing through position detection sensor 180A is increased when drive base 171 is driven in the positive direction of the X axis and reduced when drive base 171 is driven in the negative direction of the X axis. Therefore, the translation direction and the translation amount of drive base 171 can be detected. By utilizing the translation direction and the translation amount, the direction and the amount of rotation about the Y axis of barrel unit 110 can be detected.

4. Rotation Action About Z Axis (FIGS. 5, 7, 8C, and 11A to 11C)

When the electric current flows through coils 190A, 190B, 190C, drive base 171 is rotated about the Z axis by an electromagnetic force acting between coils 190A, 190B, 190C and driving magnets 173A, 173B, 173C. For example, when the electric current flows through coil 190B in the direction of the arrow shown in FIG. 5 (positive direction of the X axis) and the electric current respectively flows through coils 190A, 190C in the directions of the arrows shown in FIG. 7 (respectively the negative direction of the Y axis and the positive direction of the Y axis), drive base 171 is rotated by receiving the drive force in the direction of the arrow shown in FIG. 8C. In accordance with the amount and the direction of the electric current respectively flowing through coils 190A, 190B, 190C, the amount and the direction of rotation about the Z axis of drive base 171 are controlled.

It should be noted that the above embodiment shows a case where the electric current flows through coils 190A, 190B, 190C and the drive force of rotating drive base 171 about the Z axis is obtained. However, even in a case where the electric current flows through only coils 190A, 190C, the drive force of making drive base 171 perform the rotation action about the Z axis can be obtained.

As shown in FIGS. 11A to 11C, when drive base 171 is rotated about the Z axis, barrel unit 110, X rotation drive frame 150, and Y rotation drive frame 160 are rotated about the Z axis with respect to Z rotation support frame 120. The arrows shown in FIGS. 11A and 11C indicate the rotation directions of barrel unit 110 of this case.

When drive base 171 is rotated about the Z axis, the magnetic flux density of position detecting magnet 172C passing through position detection sensor 180C is changed. The magnetic flux density of position detecting magnet 172C passing through position detection sensor 180C is increased when drive base 171 is driven clockwise seen from the positive direction (top surface) of the Z axis and reduced when drive base 171 is driven anti-clockwise seen from the positive direction (top surface) of the Z axis. Irrespective of the rotation direction, the magnetic flux density of position detecting magnet 172A passing through position detection sensor 180A is reduced, and the magnetic flux density of position detecting magnet 172B passing through position detection sensor 180B is increased. Therefore, the rotation direction and the rotation amount of drive base 171 can be detected. By utilizing the rotation direction and the rotation amount, the direction and the amount of rotation about the Z axis of barrel unit 110 can be detected.

As described above, the lens barrel in the present disclosure includes the support portion for supporting the barrel unit, a part of the support portion being fixed to the external member, the actuator including the drive base movable in the direction parallel to the surface passing through the optical axis of the barrel unit, and the universal joint mechanism portion for linking the barrel unit and the drive base of the actuator. The support portion supports the barrel unit rotatably about the pitch axis, the roll axis, and the yaw axis with respect to the optical axis direction, and the actuator drives the barrel unit about the pitch axis, the roll axis, and the yaw axis by moving the drive base. Accordingly, a configuration that the barrel unit is rotatable in three axis directions can be realized as a simple configuration, and further size reduction of the lens barrel can be realized. Thus, the lens barrel can be widely applied to uses for a wearable camera, a monitoring camera, an in-vehicle camera, and the like.

The imaging device according to the present disclosure is formed by accommodating lens barrel 100 described in the first embodiment in the casing. Accordingly, size reduction of the imaging device having the configuration that barrel unit 110 is rotatable in three axis directions can be realized.

Other Embodiments

The first embodiment is described above as an example of the technique disclosed in the present application. However, the technique in the present disclosure is not limited to this but can be applied to other embodiments in which modification, replacement, addition, omission, and the like are appropriately performed.

Hereinafter, other embodiments will be described as examples.

In the first embodiment, by arranging the actuator on one side surface of lens barrel 100, the rotation about the three X, Y, Z axes is realized. However, rotation about the two X, Y axes may be realized.

The first embodiment shows the configuration that Y rotation support frame 140 is fixed to the casing (not shown) outside lens barrel 100. However, a configuration that the X rotation support frame or the Z rotation support frame is fixed to the casing can be adopted.

The embodiments are described above as the examples of the technique in the present disclosure. For this, the attached drawings and the detailed description are provided.

Therefore, the constituent elements described in the attached drawings and the detailed description may include not only constituent elements essential for solving the problems but also constituent elements not essential for solving the problems but used for showing the above technique. Thus, even when the non-essential constituent elements are described in the attached drawings and the detailed description, those non-essential constituent elements should not be approved as essential straightaway.

The above embodiments are to show the technique in the present disclosure. Thus, various modifications, replacement, addition, omission, and the like can be performed within the scope of the claims or the equivalent scope.

The present disclosure can be applied to a wearable camera, a monitoring camera, an in-vehicle camera, and the like.

What is claimed is:

1. A lens barrel comprising:
    a support portion for supporting a barrel unit, a part of the support portion being fixed to an external member;
    an actuator including a drive base movable in a direction parallel to a plane including an optical axis of the barrel unit; and
    a universal joint mechanism portion for linking the barrel unit and the drive base of the actuator,
    wherein the support portion supports the barrel unit rotatably about a pitch axis, a roll axis, and a yaw axis with respect to an optical axis direction, and
    wherein the actuator drives the barrel unit about the pitch axis, the roll axis, and the yaw axis by moving the drive base.

2. The lens barrel according to claim 1,
    wherein the support portion has a pitch axis support portion for holding the barrel unit rotatably about the pitch axis, a roll axis support portion for holding the barrel unit rotatably about the roll axis, and a yaw axis support portion for holding the barrel unit rotatably about the yaw axis.

3. The lens barrel according to claim 1,
wherein the universal joint mechanism portion includes a first linking portion linked with the barrel unit, a second linking portion linked with the first linking portion in such a manner that a drive force is transmittable, and a third linking portion linked with the second linking portion in such a manner that the drive force is transmittable, and
wherein the drive base of the actuator is linked with the third linking portion.

4. The lens barrel according to claim 1,
wherein the universal joint mechanism portion is linked with a side surface of the barrel unit.

5. The lens barrel according to claim 3,
wherein the third linking portion is translated in a pitch axis direction and the barrel unit is rotated about the roll axis, and
wherein the third linking portion is translated in a roll axis direction and the barrel unit is rotated about the pitch axis.

6. The lens barrel according to claim 1,
wherein the actuator is rotated about the yaw axis to drive the barrel unit.

7. The lens barrel according to claim 3,
wherein the drive base includes a driving magnet.

8. An imaging device formed by accommodating a lens barrel in a casing,
wherein the lens barrel comprises a support portion of which part is fixed to the casing for supporting a barrel unit, an actuator including a drive base movable in a direction parallel to a plane including an optical axis of the barrel unit, and a universal joint mechanism portion for linking the barrel unit and the drive base of the actuator,
wherein the support portion supports the barrel unit rotatably about a pitch axis, a roll axis, and a yaw axis with respect to an optical axis direction, and
wherein the actuator drives the barrel unit about the pitch axis, the roll axis, and the yaw axis by moving the drive base.

* * * * *